United States Patent [19]

Hamada

[11] Patent Number: 5,161,042
[45] Date of Patent: Nov. 3, 1992

[54] COLOR LIQUID CRYSTAL DISPLAY DEVICE USING DICHROIC MIRRORS FOR FOCUSING DIFFERENT COLORS IN DIFFERENT DIRECTIONS

[75] Inventor: Hiroshi Hamada, Nara, Japan

[73] Assignee: Sharp Kabushiki Kaisha, Osaka, Japan

[21] Appl. No.: 723,299

[22] Filed: Jun. 28, 1991

[30] Foreign Application Priority Data

Jun. 28, 1990 [JP] Japan .................................. 2-171923

[51] Int. Cl.⁵ .......................................... G02F 1/1335
[52] U.S. Cl. ..................................... 359/41; 359/40; 359/49
[58] Field of Search ............................. 359/40, 41, 49

[56] References Cited

U.S. PATENT DOCUMENTS 4,686,519  8/1987  Yoshida et al. ........................ 359/40
4,798,448  1/1989  Van Raalte ............................ 359/41

FOREIGN PATENT DOCUMENTS

| | | |
|---|---|---|
| 59-131278 | 7/1984 | Japan . |
| 59-230383 | 12/1984 | Japan . |
| 60-3291 | 1/1985 | Japan . |
| 60-38989 | 2/1985 | Japan . |
| 60-72927 | 4/1985 | Japan . |
| 60-165621 | 8/1985 | Japan . |
| 60-165622 | 8/1985 | Japan . |
| 60-165623 | 8/1985 | Japan . |
| 60-165624 | 8/1985 | Japan . |
| 60-166946 | 8/1985 | Japan . |
| 60-169827 | 9/1985 | Japan . |
| 60-262131 | 12/1985 | Japan . |
| 61-67003 | 4/1986 | Japan . |
| 61-153602 | 7/1986 | Japan . |
| 61-208080 | 9/1986 | Japan . |
| 61-210328 | 9/1986 | Japan . |
| 62-94826 | 5/1987 | Japan . |
| 62-203126 | 9/1987 | Japan . |
| 0262023 | 11/1987 | Japan .................................. 359/49 |
| 62-267723 | 11/1987 | Japan . |
| 62-267791 | 11/1987 | Japan . |
| 62-293222 | 12/1987 | Japan . |
| 62-293223 | 12/1987 | Japan . |
| 0299943 | 12/1987 | Japan .................................. 359/49 |
| 63-118125 | 5/1988 | Japan . |
| 3-136004 | 6/1991 | Japan . |
| 2157048 | 10/1985 | United Kingdom .................. 359/40 |

OTHER PUBLICATIONS

"New Fabrication Method of Plastic Micro Lens" by Susuki et al., Applied Physics Society Optics Meeting Microoptics Study Group, Journal vol. 5, No. 2, p. 118, 1987.

"Photolytic Technique for Producing Microlenses in Photosensitive Glass" by Borrelli et al., *Applied Optics*, vol. 24, No. 16, Aug. 15, 1985, p. 2520.

*Primary Examiner*—Janice A. Howell
*Assistant Examiner*—Anita Pellman Gross

[57] ABSTRACT

A color liquid crystal display device is provided with a light protection system for rendering a plurality of beams in mutually different wavelength ranges incident upon a common liquid crystal display element from mutually different directions. The liquid crystal display element includes a liquid crystal driving device for light modulating the respective beams transmitting therethrough at mutually different angles. Further, on the surface of the liquid crystal display element upon which the beams are incident, an optical system is provided for focusing the respective beams of different wavelength ranges from different angles and for converging light beams of similar wavelength ranges for transmission through the liquid crystal display element so that combined color images can be subsequently formed on a display screen. Moreover, with the use of a micro-lens array, when transmitting through the micro-lens array in accordance with angles of incidence, the beams incident upon the liquid crystal display element are distributively projected upon liquid crystal portions to which corresponding color signals are applied.

13 Claims, 4 Drawing Sheets

COLOR LIQUID CRYSTAL DISPLAY DEVICE USING DICHROIC MIRRORS FOR FOCUSING DIFFERENT COLORS IN DIFFERENT DIRECTIONS

BACKGROUND OF THE INVENTION

1. FIELDS OF THE INVENTION

The present invention relates to a color liquid crystal display device having a single liquid crystal display element in which, after a plurality of beams in different wavelength ranges are projected to a single liquid display element respectively from different directions, these beams are combined to display a color image. More particularly, the invention relates to the one incorporated in a small-sized color television (TV) system of projection type and an information display system.

2. DETAILED DESCRIPTION OF PRIOR ART

Subsequently, generally known color liquid crystal display (hereinafter referred to as liquid crystal display) devices of projection type will be described.

As an alternative to a conventional so-called projection type TV in which an image displayed in a cathode ray tube is projected onto a screen, a projection type TV having a liquid crystal display element has been developed. Such a TV has already been commercially available. Since the liquid crystal display element is not self-luminous, it is required to provide a light source separately. However, the liquid crystal display element is, in principle, characterized in being capable of displaying as bright an image as possible in accordance with the brightness of the light source. Also, when compared to a projection type color TV having a screen of same size and using the cathode ray tube, the color TV using the liquid crystal display element can be manufactured with remarkably small-size and light-weight. Accordingly, there are great expectations for development of the liquid crystal display element in future.

A simple matrix liquid crystal display element and an active matrix liquid crystal display element are known, depending on the driving method thereof. The present invention can be applied to both types of liquid crystal display elements. Further, as a projection type color image display method using the liquid crystal display element, there are known a three-element display method in which three liquid crystal display elements corresponding to three primary colors are used and a single-element display method in which a single liquid crystal display element is used. According to the three-element display method, optical systems for transmitting respective color lights of three primary colors and display elements for forming an image by controlling respective color lights are provided in pairs, independent of one another. Images of respective colors are optically superimposed to one another to display a full color image. Unexamined Japanese Patent Publication No. 60-3291 discloses a display device which has three individual light sources and color filters serving as source emitting the respective color beams of red, green and blue. However, it is also possible that the light emitted from the single white light source is separated into color beams of three primary colors, i.e., red, green and blue, by dichroic mirrors. Subsequently, the respective color beams are projected onto the liquid crystal display elements corresponding to the respective colors. Such a display device is disclosed by the present applicant in Unexamined Japanese Patent Publication No. 60-169827. As a white light source, a halogen lamp, xenon lamp, metal halide lamp, or the like can be used. The emission spectrum of the white light source may be continuous spectrum or bright line spectrum. With this construction, since the light emitted from the common white light source can be effectively utilized, images are three times as bright as those obtained in the conventional single-element display construction to be described below, provided that other conditions are equal. However, more parts are required than the single-element display construction. Accordingly, in terms of cost and size, the above display device is generally disadvantageous compared to the single-element display device. Further, it will be noted that the dichroic mirror is made by forming a dielectric multi-layer thin film with a known thin film formation technique so as to selectively reflect or transmit only the light having wavelength to be found on a transparent substrate such as glass. Alternatively, the dichroic mirror may be combined prisms such as a dichroic prism used in an image pick-up device for a color TV, the surface of the prisms having similar dielectric multi-layer thin film for selecting the wavelength formed thereon. Hereinafter, both types of mirrors are merely referred to as dichroic mirrors.

On the other hand, in the former construction in which only one liquid crystal display element is used, similar to a direct vision liquid crystal TV, the light is projected on a liquid crystal display element having a color filter pattern of three primary colors in the form of a mosaic by the use of an optical system similar to a slide projector. Such a construction is, for example, disclosed in Unexamined Japanese Patent Publications No. 59-131278 and No. 59-230383. In the case where this single-element display method is adopted, the optical system can be simple in its construction and only one liquid crystal display element is used. Accordingly, the single-element display method is suitable to be adopted in a small-sized projection type system.

However, according to the single-element display method, about two-thirds of the light projected on the liquid crystal display element is absorbed or reflected by the color filter. For example, a red color filter is arranged on a picture element for displaying red. However, green and blue light are cut by the red color filter. Accordingly, only one-third of the light incident upon the liquid crystal display element can be made use of. Therefore, when compared to the case where three liquid crystal display elements are used with the same light source, the brightness of the screen is reduced to about one-third.

The conventional projection type color liquid crystal display device is summarily described above. In the single-display device, the white light is projected upon the liquid crystal display element and the color display is effected by arranging a micro dichroic mirror, micro-prism array, or diffraction grating for its corresponding group, each group consisting of picture elements of three primary colors. Such a construction is disclosed in Unexamined Japanese Patent Publications No. 61-210328, No. 62-293222, No. 62-293223, and No. 63-118125. However, it is, in reality, very difficult to form a micro dichroic mirror of about 100 μm. Also, when the method is adopted for spectrally resolving the projected light through the use of a micro-prism array or diffraction grating, it is at present difficult to set an aperture efficiency of the picture element sufficiently high. Accordingly, it has been shortcoming of the above method that only a portion of the resolved spectral compositions can be made use of.

SUMMARY OF THE INVENTION

It is an object of the invention to improve the brightness of a screen of a color liquid crystal display device for use in a color liquid crystal display TV of a single-element projection type, a thin color information display device or other display devices.

It is further an object of the invention to provide an inexpensive color liquid crystal display device.

Accordingly, a color liquid crystal display device of the invention is provided with a light projection system for rendering a plurality of beams in mutually different wavelength ranges incident upon a common liquid crystal display element from mutually different directions. The liquid crystal display element comprises liquid crystal driving means for light modulating the respective beams transmitting therethrough at mutually different angles in units of a beam. Further, on the surface of the liquid crystal display element upon which the beams are incident, an optical system is provided for making the respective beams transmitted through the liquid crystal display element form into combined color images on a display screen. Moreover, with the use of a micro-lens array, when transmitting through the micro-lens array in accordance with angles of incidence, the beams incident upon the liquid crystal display element are distributively projected upon liquid crystal portions driven in units of a beam by signal electrodes to which corresponding color signals are applied.

According to a construction of the invention, in a single-element color liquid crystal display device, a plurality of beams having wavelength necessary for displaying an image are made incident upon a common liquid crystal display element at mutually different angles, and then light-modulated in units of a beam. The transmitted beams are combined, so that a color image is displayed on a display screen. In this case, it is possible that almost all the beams are used for displaying the image without being cut in the process. Accordingly, the light is highly efficiently used and therefore bright color images can be obtained.

According to the invention, it is made possible to efficiently use the light from the light source by providing a white light source and three dichroic mirrors for selectively reflecting the beams of three primary colors, red, green, and blue, or a liquid crystal display element for light-modulating each beam so as to correspond a plurality of beams to a picture element array. Therefore, it is possible to provide a small-sized color image display device whose screen is very bright, taking advantage of being a single-element display device.

BRIEF DESCRIPTION OF THE DRAWINGS

These and other objects, features and advantages of the invention will become more apparent upon a reading of the following detailed specification and drawing, in which.

DETAILED DESCRIPTION OF THE PREFERRED EMBODIMENTS

Hereinafter, detailed description of the preferred embodiments of the invention will be described with reference to the drawings.

EMBODIMENT 1

Figure 1:
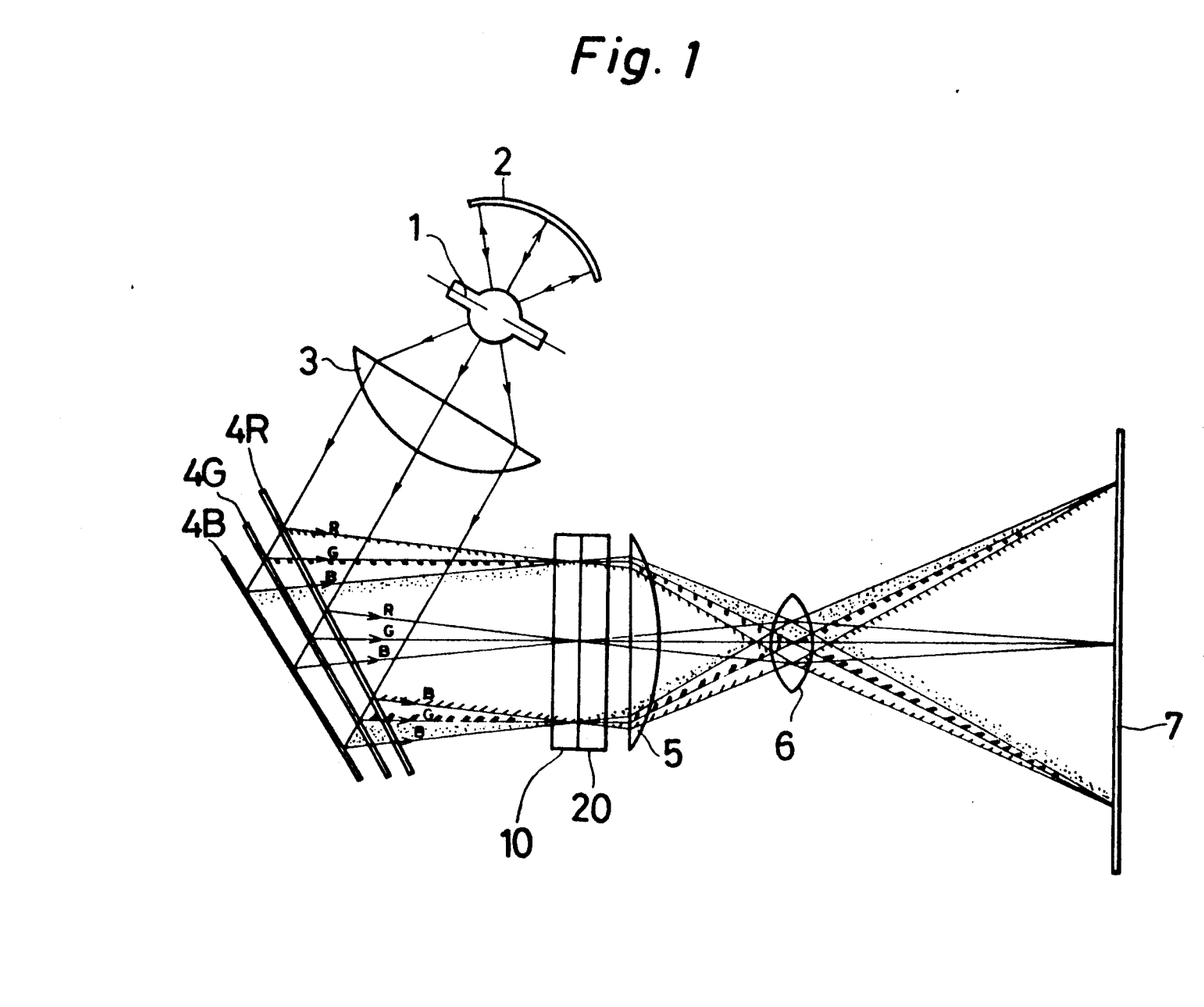
FIG. 1 is a diagram of a color liquid crystal display device for showing an embodiment of the invention.

FIG. 1 is a diagram of a light source of a single-element projection type color image display device for showing an embodiment of the invention. Indicated at 1 is a white light source. In this embodiment, a metal halide lamp of 150 W is used as a light source with an arc of the lamp arranged perpendicular to the surface of FIG. 1. An arc length AL and an arc radius A$\phi$ of the lamp are respectively 5 mm and 2.2 mm. It will be noted that a halogen lamp or a xenon lamp can be used as a white light source as well. Behind the white light source 1 is disposed a spherical mirror 2. In front of the white light source 1 is arranged a condenser lens 3 having an aperture of 80 mm$\phi$ and a focal length fc of 60 mm. The spherical mirror 2 is arranged with the center thereof corresponding with the center of a light emitting portion of the white light source 1. Further, the white light source 1 is arranged with the center of the light emitting portion thereof corresponding with a focus of the condenser lens 3. With these arrangements, the light projected from the white light source 1 upon the condenser lens 3 becomes beams of white light substantially parallel to one another after transmitting through the condenser lens 3. At this time, the degree of parallelization of beams are about 2.2° in the lengthwise direction of the arc of the white light source 1, i.e., in the direction perpendicular to the surface of FIG. 1, and about 1° in the radial direction of the arc, i.e., in the direction parallel to the surface of FIG. 1. Forwardly of the condenser lens 3 three kinds of dichroic mirrors 4R, 4G, and 4B are arranged. The dichroic mirrors 4R, 4G, and 4B have characteristics of selectively reflecting or transmitting the light in the respective wavelength ranges of red, green, and blue light. The dichroic mirrors are disposed on an optical axis in the order of 4R, 4G, and 4B. Hereinafter, R, G and B respectively refer to red, green, and blue. These dichroic mirrors are fabricated by the use of a known multi-layer thin film coating technique. The respective dichroic mirrors are coated with multi-layer thin film so as to satisfy the following conditions: Red dichroic mirror reflects the visible light having wavelength of at least about 600 nm. Blue dichroic mirror reflects the visible light having wavelength of at most about 500 nm. Green dichroic mirror reflects the visible light in the wavelength range of between about 500 nm and about 570 nm. It is sufficient that the dichroic mirror arranged furthest from the white light source 1 (in this embodiment, 4B) reflects the visible light still available after transmitting the dichroic mirrors 4R and 4G. Accordingly, the dichroic mirror 4B is not required to reflect the light in other wavelength ranges. If any of the dichroic mirrors 4R, 4G, and 4B is designed to transmit infrared rays, an increase in temperature of the liquid crystal display element can be effectively suppressed.

The dichroic mirrors 4R, 4G, and 4B are so arranged in this embodiment that an angle of incidence to the dichroic mirror 4R is around 30° on the optical axis and the dichroic mirrors 4G and 4B are rotated to the left about the direction normal to the surface of FIG. 1 by several degrees of angles from their respective positions parallel to the dichroic mirror 4R. The dichroic mirror 4B is rotated more to the left than the dichroic mirror 4G. The difference in degrees of incidence between the two dichroic mirrors is calculated based on an array pitch P of the picture elements of a liquid crystal display element 20 and a focal length fμ of micro-lenses 10. With this arrangement of the optical system, for example, the light in the wavelength range of red light is reflected by the dichroic mirror 4R and incident upon the micro-lens array 10 attached to the liquid crystal display element 20 disposed on an optical path of the light reflected by the dichroic mirror 4R. The light in the wavelength range of green light is reflected by the dichroic mirror 4G after transmitting through the dichroic mirror 4R, and similarly incident upon the micro-lens array 10 at a different angle after transmitting again the dichroic mirror 4R. The light in the wavelength range of blue is reflected by the dichroic mirror 4B after transmitting both the dichroic mirrors 4R and 4G, and similarly incident upon the micro-lens array 10 at another different angle after transmitting again both the dichroic mirrors 4R and 4G. In this way, the light from the single white source 1 is separated into beams of three colors, which are in turn incident upon the micro-lens array 10 from three different directions. It will be noted that an angle of incidence of the white light to the dichroic mirrors 4R, 4G, and 4B are conventionally set at about 45°, but it is not necessary to set the angle of incidence at about 45°. Rather, in the case where the angle of incidence is set smaller as in the present embodiment, shifts in reflectance spectrum due to dispersion in an angle of incidence can be made smaller.

Figure 2A:
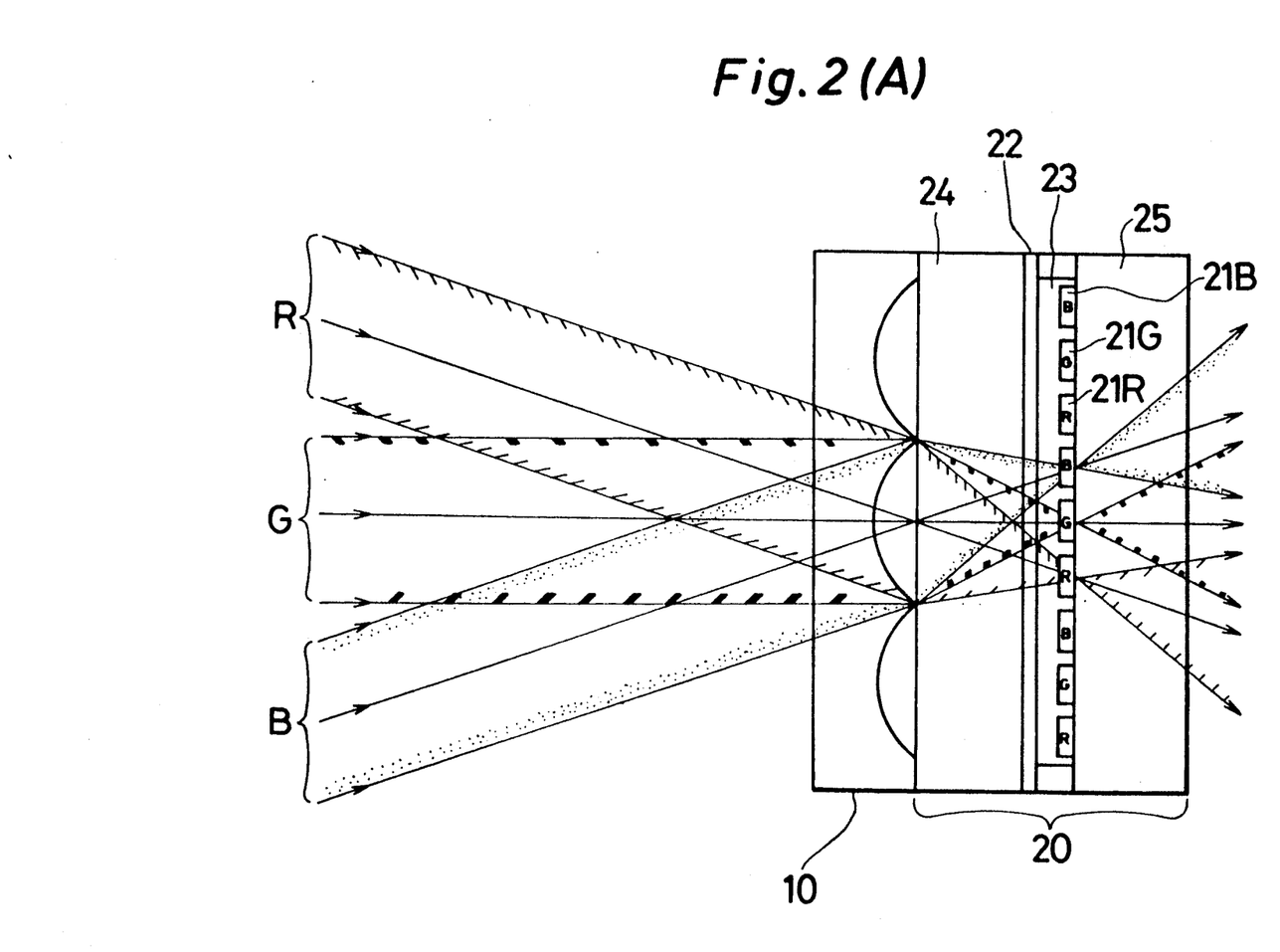
FIG. 2(A) is sectional diagram showing a liquid crystal display element and a micro-lens array used in the embodiment.

FIG. 2(A) is a sectional diagram of the liquid crystal display element 20 and the micro-lens array 10 used in the embodiment. As shown in FIG. 2(A), the liquid crystal display element 20 comprises two glass substrates 24, 25, a liquid crystal layer 23 filled between the two substrates 24 and 25, signal electrodes 21R, 21G, and 21B and a scanning electrode 22. The signal electrodes 21R, 21G, 21B and the scanning electrode 22 constitute a matrix electrode structure so as to drive the liquid crystal 23 according to the simple matrix driving method, and respectively arranged on the inner surfaces of the substrates 24 and 25. The signal electrodes 21R, 21G, 21B and the scanning electrode 22 are all formed by transparent conductive film. To the signal electrodes 21R, 21G, and 21B are inputted R-, G-, and B-signals. Further, the red light reflected by the dichroic mirror 4R transmits the signal electrode 21R through the micro-lens array 10. Similarly, the green light reflected by the dichroic mirror 4G transmits the signal electrode 21G through the micro-lens array 10. Further similarly, the blue light reflected by the dichroic mirror 4B transmits the signal electrode 21B through the micro-lens array 10.

Figure 2B:
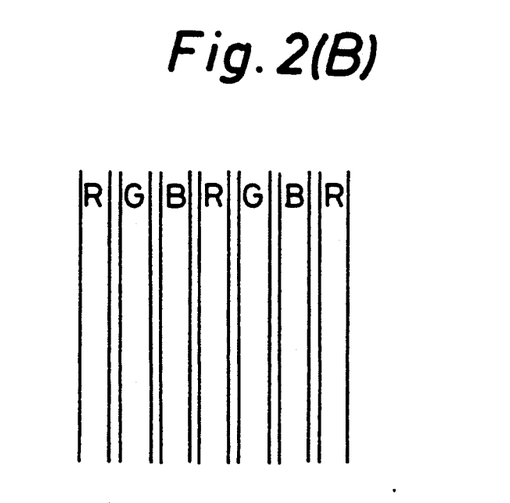
FIG. 2(B) is a plan view of an array pattern of signal electrodes.

FIG. 2(B) is a plan view of an array pattern of the signal electrodes 21R, 21G, and 21B. In this embodiment, instead of using a conventional mosaic color filter, the white beams projected from the single light source are separated into a plurality of color beams, e.g., into beams of three primary colors. These separated beams are incident upon the micro-lens array 10 disposed on the surface of liquid crystal display element 20 facing the light source from the different directions. The beams of respective colors are converged at different positions on the micro-lens array 10. At this time, if the angles of incidence of respective color beams to the micro-lens array 10 are properly selected so as to satisfy a condition to be described below, convergence spots of respective color beams can be made incident upon different apertures of the respective picture elements. This condition is: In the case where a pin hole is placed in the center of the micro-lens, the light passed through the pin hole passes the center of the aperture of the corresponding picture element. This condition can be expressed as follows.

$$\tan \theta = p/f\mu$$

where $\theta$ is a difference in the angles of incidence of any two beams out of plural beams, $f\mu$ is a focal length of the micro-lens in the air, and p is a pitch between the corresponding color picture elements.

In this embodiment, in order to separate the white beams projected from the single white light source 1 into a plurality of color beams, e.g., into beams of three primary colors and in order to make the plurality of color beams incident upon the micro-lens array 10 from the different directions, the dichroic mirrors 4R, 4G, and 4B corresponding to the spectrum of the separated color beams are arranged slightly slanted from their respective positions parallel to one another so as to satisfy the aforementioned conditions concerning the angle of incidence. Further, the dichroic mirrors 4R, 4G, and 4B are so spaced in relation to one another that the beams reflected by the respective dichroic mirrors are to overlap in a display region on the liquid crystal display element 20.

Next, there will be described a significant element in the embodiment, namely micro-lens array 10. According to the aforementioned active matrix driving method, in order to supply voltage independently for driving each picture element, an element such as a thin film transistor or MIM (metal-insulator-metal) is provided for each picture element. However, wiring between the picture elements are necessary so as to supply the driving signals to the picture elements. Also, in the case where the light is incident upon regions other than the picture element regions, a black level of the image in the display screen stands out, with the result that contrast of the image is reduced. To prevent this, shadow masks are normally provided in the non-picture element regions so as to absorb or reflect the light which is not to be used in displaying the image. Accordingly, in the case where a display panel is illuminated at the same illuminance, the smaller aperture efficiency of the display panel is, the darker the screen is likely to be. In order to overcome such a problem, Unexamined Japanese Patent Publication Nos. 60-165621 to 165624 disclose a construction in which a micro-lens array is provided closer to a light source than a display panel and the illuminating light is converged in the respective picture element regions so as to impove the efficiency in the use of the projected light. However, these Publications do not specify the kind of light source, nor the degree of parallelization of the illuminating light. Further, they do not specify the projection of the image. However, upon looking at their constructions, it can be inferred that a visual angle will be expanded. Also, Unexamined Japanese Patent Publication No.

60-262131 discloses a construction in which a pair of lens elements are provided on both sides of a display panel for each picture element, and the illuminating light incident upon the display panel is converged in a picture element region by first lens, and then transmits through the display region. Then, the light diverging at an angle determined by the number of apertures is again converged into a plurality of beams substantially parallel to one another by the second lens.

On the other hand, in a projection type image display device, in the case where a micro-lens array provided only on a surface of a liquid crystal display element facing a light source, beams substantially parallel to one another which are incident upon the micro-lens array are converged, transmit through a picture element region of the liquid crystal display element, and are modulated in accordance with an image signal. Then, the converged beams are diverged within a solid angle determined by the number of aperture (NA) of the micro-lens. However, if the aperture of the projection lens is selected so as to receive the beams, the light beams transmitted through the liquid crystal display panel are not subject to restriction. More specifically, the light incident upon the liquid crystal display panel and transmitted through the picture element region are effectively used. Accordingly, compared to a projection type image display device not having a micro-lens, a brighter image can be obtained.

As a formation method of the micro-lens array used for these purposes, the following method can be considered.

(1) Method for obtaining a lens of a refractive index distribution type by selectively diffusing ions. According to this method, a host glass plate is soaked in fused salt and different alkali ions or the like are exchanged between the glass plate and the fused salt through a mask provided on the glass plate, so that the glass plate having a refractive index distribution corresponding to the mask pattern can be obtained. (Electronics Letters Vol. 17 No. 18 P452 (1981))

In the case where the micro-lens is fabricated by this method, the lens has no irregularities on an outer surface thereof. Accordingly, such a micro-lens can be bound to the liquid crystal display panel with no air therebetween by the use of Canada balsam and a light hardening resin. Therefore, reflection loss on the surface of the substrate can be reduced to be almost negligible.

(2) Method for obtaining a micro-lens by machining the plastic or the glass or molding them by a metal pattern. Besides a direct processing, the metal pattern can be fabricated by using a pattern obtained by the methods described in the following methods (3) to (7) as an original pattern and transferring it through the use of an electroforming technique or the like.

(3) Method for fabricating a convex lens by using a phenomenon in which, when certain kinds of photosensitive resin are exposed in the form of a pattern, unreacted monomers move from a non-exposed portion to an exposed portion, so that each exposed portion is banked. (Applied Physics Society Optics Meeting Microoptics Study Group Journal Vo. 5 No. 2 p118 (1987), ibid Vol. 6 No. 2 p87 (1988))

(4) Method for obtaining a convex lens by patterning thermoplastic resin into a flat form of the lens by the use of a known photography technique or the like, then heating the same up to a temperature of not lower than a softening point so as to create fluidity to facilitate occurrence of die wear of the edge of the pattern. In this case, if the thermoplastic resin is photosensitive, it can be patterned just by being exposed itself. (Unexamined Japanese Patent Publications No. 60-38989, No. 60-165623, and No. 61-67003)

(5) Method for obtaining a convex lens by applying a proximity exposure (an exposure method by which a photomask is not contacted) to a photosensitive resin and making the resin have amounts of photoreaction product distributed in accordance with the reduction in intensity of illumination near the edge of the pattern. (Unexamined Japanese Patent Publication No. 61-153602)

(6) Method for obtaining a lens by projecting the light having an intensity distribution to a photosensitive resin and forming a pattern of refractive index in accordance with the intensity of the light. (Unexamined Japanese Patent Publication No. 60-72927)

Material whose refractive index is variable in accordance with the projected light is disclosed in Unexamined Japanese Patent Publication No. 60-166946)

(7) Method for obtaining a convex lens by projecting the patterned light to photosensitive glass whose photosensitivity is given by applying silver-salt to the glass, having thus produced silver crystalline nucleus grown by heat treatment, and utilizing the volumetric shrinkage accompanied by induced crystallization of the glass. (Applied Optics Vol. 24 No. 16 p2520 (1985))

Further, it is disclosed that a micro-lens array and a mosaic color filter are combined to be applied to a liquid crystal display element in Unexamined Japanese Patent Publications No. 61-208080, No. 62-94826, No. 62-203126, No. 62-267791, and No. 62-267723. However, these Publications do not specify that such a construction can be applied to the projection type display device. Further, in the former four Publications, a picture element, a color filter, and a micro-lens are corresponded to one another as one group. In the last Publication, it is characterized that a micro convex lens of transparent resin having such a radius to cover three color pixels arranged in line is provided on a color filter.

In FIG. 2(A), a deflecting plate, an orientation film and the like which are elements of the liquid crystal display element 20 are omitted for the sake of simplicity. In this embodiment, a simple matrix type liquid crystal display element is used which is operated in a super twisted nematic (STN) mode in which the number of scanning electrodes is 220, a pitch between the scanning electrode is 200 $\mu$m, the number of signal electrodes is 600, and a pitch between the signal electrodes is 100 $\mu$m. As opposed to a conventional single-element liquid crystal display device, according to the invention, it is not required that the liquid crystal display element be provided with a color filter. However, color allocations of driving signals are longitudinal stripe type and the respective colors are applied to the signal electrodes 21R, 21G, and 21B. As a corresponding micro-lens array 10, a lenticular lens substrate is used in which a longitudinal lenticular lens having width of 300 $\mu$m corresponding to three signal electrodes 21R, 21G, and 21B is disposed on a transparent substrate by an ion exchange method. The lenticular lens comprises semi-cylindrical lenses arranged in parallel. A focal length of the lenticular substrate is set so as to be substantially equal to the width t (t=1.1 mm) of the glass substrate 24 of the liquid crystal display element 20. However, when the focal length of the micro-lens is measured in the air, it is calculated based on the following expression to be 0.72 mm:

$$t/n = 1.1 \text{ mm}/1.53 = 0.72 \text{ mm}$$

wherein n is a refractive index of the liquid crystal display element. The lenticular lens substrate is attached to the surface of the liquid crystal display element, upon which the light is incident, so that the axial direction of the lenticular lens and the longitudinal direction of the signal electrode of the liquid crystal display element become parallel to each other.

Figure 2C:
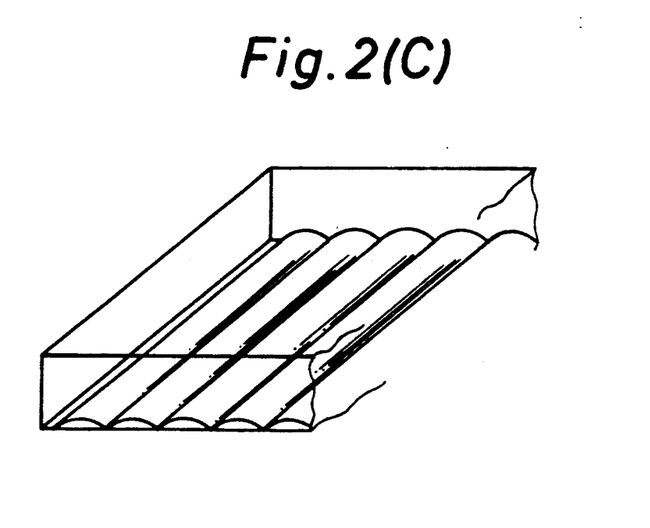
FIG. 2(C) is a perspective view of the micro-lens array.

FIG. 2(C) is a perspective view showing the micro-lens array 10. When parallel beams are projected onto the micro-lens array 10 from a predetermined direction, the respective beams are converged in positions, where the optical axes of the respective micro-lenses intersect with liquid crystal layer, at intervals of 300 μm correspondingly to the pitch of the lenticular lenses in the form of a line. The width W of the convergence line is:

$$W = A\phi \times f\mu/fc$$
$$= 2.2 \text{ mm} \times 0.72 \text{ mm}/60 \text{ mm} = 26.4 \text{ μm}$$

wherein $A\phi$ is a radius of an arc of the light source, $f\mu$ is a focal length of a micro-lens, and fc is a focal length of a condenser lens. Therefore, the convergence line can be contained in the width of the stripe signal electrode.

Next, when the parallel beams are projected onto the micro-lens array 10 from the direction inclined by an angle θ ($\theta = \tan^{-1} (100/720)) = 8°$) from the original direction, the convergence lines shift laterally by 100 μm respectively from the original ones and thereby are to be contained in the adjacent signal electrode. Accordingly, the parallel beams of three primary colors are projected onto the micro-lens array 10 from three different directions, the two adjoining directions differing by 8°. The convergence lines of three primary colors are sequentially formed on the adjacent three signal electrodes at the intervals of 100 μm.

When the respective signal electrodes are driven by video signals corresponding to the colors of a convergence line formed thereon, the intensities of the light of the respective colors are modulated in accordance with the video signals. The modulated light is further projected onto a screen 7 through a projection lens 6 to display a color image thereon. In order to make an aperture of the projection lens 6 smaller, it may be appropriate that a field lens 5 be disposed right behind the liquid crystal display element 20 so as to converge the diverging light after transmitting through the liquid crystal display element 20.

In the conventional single liquid crystal display element provided with a mosaic color filter or a stripe color filter, any of color filters of three primary colors is formed on an upper or lower surface of a picture element electrode. Accordingly, about two-thirds of the light incident upon the liquid crystal display element is cut off. However, in this embodiment, since all the incident light is to be utilized, the brightness of the display screen is improved three-fold as compared to the conventional one.

EMBODIMENT 2

Figure 3A:
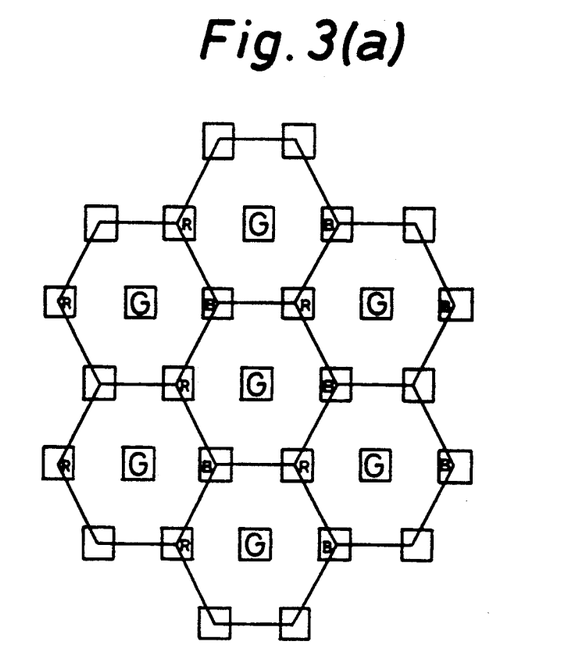
FIGS. 3(a), 3(b) are plan views of a picture element electrode array and a micro-lens array showing respectively other embodiments of the invention.

Instead of the simple matrix type liquid crystal display element used in the first embodiment, there will be described an embodiment in which an active matrix type liquid crystal display element is used. The liquid crystal display element in a twisted nematic (TN) mode is drivingly dynamic displayed through an amorphous silicon semiconductor thin film for switching known rectangular picture elements arranged in the form of a matrix. A delta array is adopted: Pigment pitches are 100 μm in both the longitudinal and the lateral directions. Size of an aperture of the picture element is 50×70 Mn. The number of picture elements are 450 by 600. (450 pigments are arranged in vertical rows and 600 picture elements are arranged in horizontal columns.) Aperture efficiency of the picture elements is 35%. Although a light source and dichroic mirrors are disposed in a manner similar to the first embodiment, a metal halide lamp serving as a light source is arranged so that an arc thereof becomes parallel to the surface of FIG. 1. In the case where the picture element array is a delta array, the use of lenticular lenses is inappropriate. Forms of each of the individual micro-lenses is not necessarily similar to that of the corresponding group of picture elements. Accordingly, a micro-lens array is formed by the ion exchange method in which hexagonal micro-lenses are precisely arrayed. The hexagonal micro-lenses are made by mutually fusing circumferential portions of spherical lenses. FIG. 3(a) shows an example of the relative positional relationship between the picture element array and micro-lens array. In FIG. 3(a), the picture elements are arrayed as if square bricks are arrayed. The hexagonal micro-lenses are arrayed in the form of a honeycomb so as to constitute the micro-lens array. The green light is projected onto both the liquid crystal display element and the micro-lens array from the perpendicular direction (i.e., from the direction perpendicular to the surface of FIG. 3(a)), and convergence spots are formed within the green picture elements disposed on the optical axes of the respective micro-lenses. The red and the blue light are projected from the direction tilted by 8° to the left and to the right respectively, and convergence spots of the respective colors are formed in the green picture element. In this way, the beams of respective colors are converged in the red, green, and blue picture elements. Size of the convergence spot can be obtained by the calculation similar to that described with reference to the first embodiment, i.e., 60 μm×26.4 μm. Therefore, the convergence spot can be contained in the aperture of the picture element.

Figure 3B:
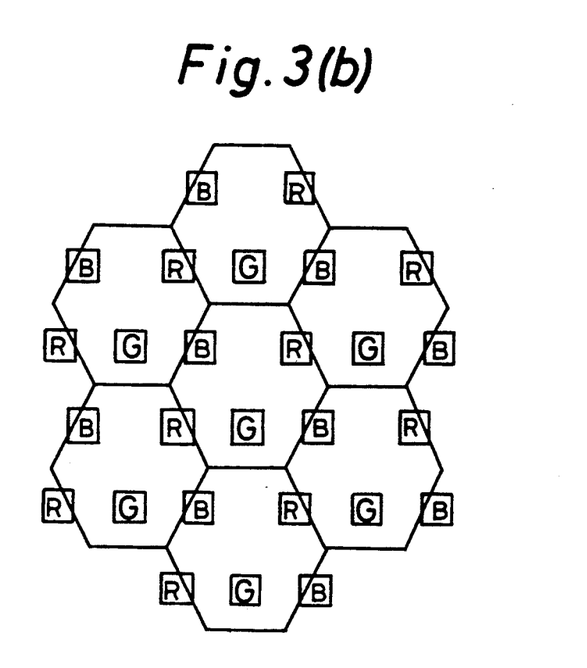

Further, in the example shown in FIG. 3(a), three convergence spots of three primary colors converged by one micro-lens are arranged laterally. It may be appropriate that three picture elements are treated as a group as shown in FIG. 3(b) and the corresponding color beams are converged to the respective picture elements. In the latter case, it is required that the direction normal to the surface of the dichroic mirrors shown in FIG. 1 be inclined from the direction of the surface of FIG. 1. However, angles made by the optical axes of the micro-lenses and the illuminating light of respective colors become smaller. Accordingly, aberration of the micro-lens can be reduced.

Moreover, the order of color separation by the dichroic mirror is not limited to the one described in this embodiment. Further, in this embodiment, the example is illustrated in which a white light is separated into beams of three primary colors. However, the invention can be applied to a construction in which a white light is separated into beams of four or more colors for graphic display.

The technique for forming a precise array of the micro-lenses was filed on Oct. 23, 1989 by the present applicant et al. (Unexamined Japanese Patent Publication No. 1-275410 which is an joint application with Nippon Itagarasu Kabushiki Kaisha) According to this technique, boundary lines of the micro-lenses serve as a vertical bisector of line segments joining the centers of the adjacent micro-lenses.

The aforementioned embodiments are described with respect to the projection type liquid crystal display device. If a display screen is formed on the surface of the liquid crystal display device upon which the light is incident through a scattering transmission plate so that the respective transmitted beams are combinedly scattered to form a color image on the display screen, the invention can be incorporated in a direct vision type display device other than the projection type one. Further, the color beams projected from the different directions are distributively projected upon the signal electrodes in units of a beam by the use of the micro-lenses, the color display device receiving color signals corresponding to the respective color beams. Further, the signal electrode may be additionally provided with a function of guiding the light so as to transmit only the beams projected from a predetermined direction, and reflect or absorb the beams projected from other directions. Thereby, only the color beams projected at corresponding angles are to transmit through the signal electrode.

When a single-element projection type color liquid crystal display device as shown in the above embodiment is compared with a conventional single-element projection type color liquid crystal display device having, instead of a micro-lens array, a mosaic color filter, the brightness of the display screen of the former display device is 7.5 times as much as that of the latter one. The improvement in the brightness of the display screen is obtained for the following two reasons. One reason is: In the conventional display device, about two-thirds of the light is cut by the mosaic color filter. However, in the display device of the embodiment, almost all the light is effectively utilized, thereby increasing the brightness of the display screen about 3 times. The other reason is: In the conventional display device, aperture efficiency of the picture element is 35%, so that 65% of the light incident upon the liquid crystal display element is wasted by being cut by the shadow mask. However, in the display device of the embodiment, the incident light is converged in the aperture of the picture element, so that most of the incident light can be effectively utilized. Consequently, the brightness of the display screen is increased about 2.5 times. Therefore, the brightness of the display screen in the display device of the embodiment is 7.5 (3×2.5) times as much as that of the conventional display device.

According to the invention, in the case where degree of parallelization of the illuminating light is bad, and the light is incident upon the liquid crystal display element from the direction different from the predetermined direction, i.e., stray light, there may be a possibility of inducing a reduction in contrast on the display screen and also in color purity. Accordingly, it may be appropriate that the white light from the light source is temporarily converged on spots by the condenser lens and the unnecessary light is cut by a slit or a pin hole. Further, instead of separating the white light, three light sources of three primary colors may be provided so as to project the liquid crystal display element from the different directions.

This invention may be embodied in several forms without departing from the spirit of essential characteristics thereof. Accordingly, the present embodiment is illustrative and not restrictive, since the scope of the invention is defined by the appended claims rather than by teh description preceding them.

Further, all changes that fall within meets and bounds of the claims, or the equivalence of such meets and bounds are intended to embraced by the claims.

What is claimed is:

1. A color liquid display device for displaying an image on a display screen, the device comprising:
   a light source for generating light;
   a plurality of dichroic mirrors for splitting the light into a plurality of light beams of different wavelength ranges;
   liquid crystal display element for receiving a plurality of beams of different wavelength ranges, wherein said light beams are incident upon the liquid crystal display element from mutually different directions, the liquid crystal display element including,
   liquid crystal driving means for modulating said light beams transmitted therethrough, and
   an optical means disposed on the surface of said liquid crystal driving means which is on the light incident side, for focusing said light beams on pixels of the liquid crystal display element so that combined color images can be subsequently formed on the display screen.

2. The color liquid crystal display device of claim 1 wherein three dichroic mirrors are provided for separating the light into three light beams each with a different wavelength range, a first wavelength range being at least 600 nm, a second wavelength range being between 500 nm and 570 nm, and a third wavelength range being at most 500 nm, so that the beams in the respective wavelength ranges are incident upon the liquid crystal display element.

3. The color liquid crystal display device of claim 1 wherein the liquid crystal display element further comprises:
   a plurality of signal electrodes to which a display signal for each color is independently applied so as to drive the liquid crystal; and
   said optical means including a micro-lens array for focusing said respective light beams, incident on the liquid crystal at different angles, on corresponding pixels of said liquid crystal display.

4. The color liquid crystal display device of claim 3 wherein the micro-lens array includes a selected one of machined glass and plastic having a uniform refractive index.

5. The color liquid crystal display device of claim 3 wherein the micro-lens array is composed of a plurality of lenses, each lens having a refractive index distribution different from glass, produced by a selective ion exchange method.

6. The color liquid crystal display device of any one of claims 3 to 5, wherein the micro-lens array includes a plurality of lenticular lenses and the plurality of signal electrodes are in the form of stripes.

7. The color liquid crystal display device of any one of claims 3 to 5, wherein the micro-lens array includes a plurality of lenses in the form of a honeycomb and the plurality of signal electrodes are connected to picture elements in a selected one of a mosaic and delta arrangement.

8. A display apparatus comprising
a light source for generating light;
a plurality of dichroic mirrors, each for splitting the light into a plurality of light beams of different wavelength ranges, light beams of different wavelength ranges traveling in different angular directions;
beam focusing means for receiving said light beams from different incident angular directions and for converging said light beams at different position, respectively;
display means including a plurality of pixels, pixels of a common color receiving said converged light beams of the same color, for modulating an image for subsequent display.

9. The display apparatus of claim 8, wherein the beam focusing means includes a microlens array.

10. The display apparatus of claim 9, wherein the microlens array includes a plurality of hexagonal microlenses.

11. The display apparatus of claim 10, wherein the display means includes a plurality of red, green and blue pixels, each arranged to correspond to one of the center and a vertex of a hexagonal microlens.

12. The display apparatus of claim 8, wherein the display means includes three groups of subpixels being controlled with a display color signal corresponding to red, green and blue, respectively, arranged in a delta arrangement.

13. The display apparatus of claim 8, wherein the display means includes a plurality of red, green and blue pixels, arranged in a mosaic pattern.

* * * * *